United States Patent
Kulicke et al.

(10) Patent No.: US 11,624,385 B2
(45) Date of Patent: Apr. 11, 2023

(54) TOLERANCE-COMPENSATING FASTENING ARRANGEMENT FOR FASTENING A COMPONENT TO A STRUCTURE

(71) Applicant: Premium Aerotec GmbH, Augsburg (DE)

(72) Inventors: Thorsten Kulicke, Augsburg (DE); Sascha Marzia, Augsburg (DE); Horst Schunn, Augsburg (DE)

(73) Assignee: Premium Aerotec GmbH

( * ) Notice: Subject to any disclaimer, the term of this patent is extended or adjusted under 35 U.S.C. 154(b) by 158 days.

(21) Appl. No.: 17/245,617

(22) Filed: Apr. 30, 2021

(65) Prior Publication Data
US 2021/0348632 A1    Nov. 11, 2021

(30) Foreign Application Priority Data

May 5, 2020    (EP) .................................... 20172864

(51) Int. Cl.
*B64C 1/06* (2006.01)
*F16B 5/02* (2006.01)

(52) U.S. Cl.
CPC ............ *F16B 5/0208* (2013.01); *B64C 1/066* (2013.01)

(58) Field of Classification Search
CPC ........ F16B 21/16; F16B 21/186; F16B 43/02; F16B 5/025; F16B 19/02; F16B 5/0225
USPC ................. 411/266, 267, 277, 278, 511, 537
See application file for complete search history.

(56) References Cited

U.S. PATENT DOCUMENTS

| 3,151,652 | A | | 10/1964 | Zahodiakin |
| 3,603,626 | A | * | 9/1971 | Whiteside ............... F16B 19/02 411/57.1 |
| 5,746,561 | A | * | 5/1998 | Nygren, Jr. ........... F16B 5/0225 411/113 |
| 2006/0088398 | A1 | * | 4/2006 | Lund ..................... F16B 5/0225 411/398 |

(Continued)

FOREIGN PATENT DOCUMENTS

| EP | 3254951 A1 | 12/2017 |
| EP | 3254967 A1 | 12/2017 |

OTHER PUBLICATIONS

Extended European Search Report for Application No. 20172864.9, dated Oct. 8, 2020, 5 pages.

*Primary Examiner* — Sarang Afzali
*Assistant Examiner* — Darrell C Ford
(74) *Attorney, Agent, or Firm* — Lerner David LLP

(57) ABSTRACT

A tolerance-compensating fastening arrangement for fastening a component to a structure includes a male fastener having a fastening bolt having a serrated outer profile; and a female fastener having a socket base arranged therewithin movable along a horizontal plane and having a conical funnel to receive the bolt such that horizontal tolerances between the male and female fasteners are compensable by movement of the socket base actuated through contact of the bolt with an inner surface of the funnel; and a socket jaw arranged on the socket base and having several jaw segments arranged circumferentially around a vertical axis to form a central jaw opening configured to receive the bolt through the funnel, the jaw segments configured movable radially with respect to the vertical axis to adjust a size of the jaw opening to retain the bolt along the vertical axis via contact of the serrated inner and outer profiles.

15 Claims, 7 Drawing Sheets

(56) References Cited

U.S. PATENT DOCUMENTS

| | | | |
|---|---|---|---|
| 2014/0356063 A1* | 12/2014 | Tung | F16B 5/0208 |
| | | | 403/374.4 |
| 2017/0051778 A1* | 2/2017 | Dickinson | B60R 13/00 |
| 2018/0216644 A1* | 8/2018 | Mateo | F16B 5/0225 |

* cited by examiner

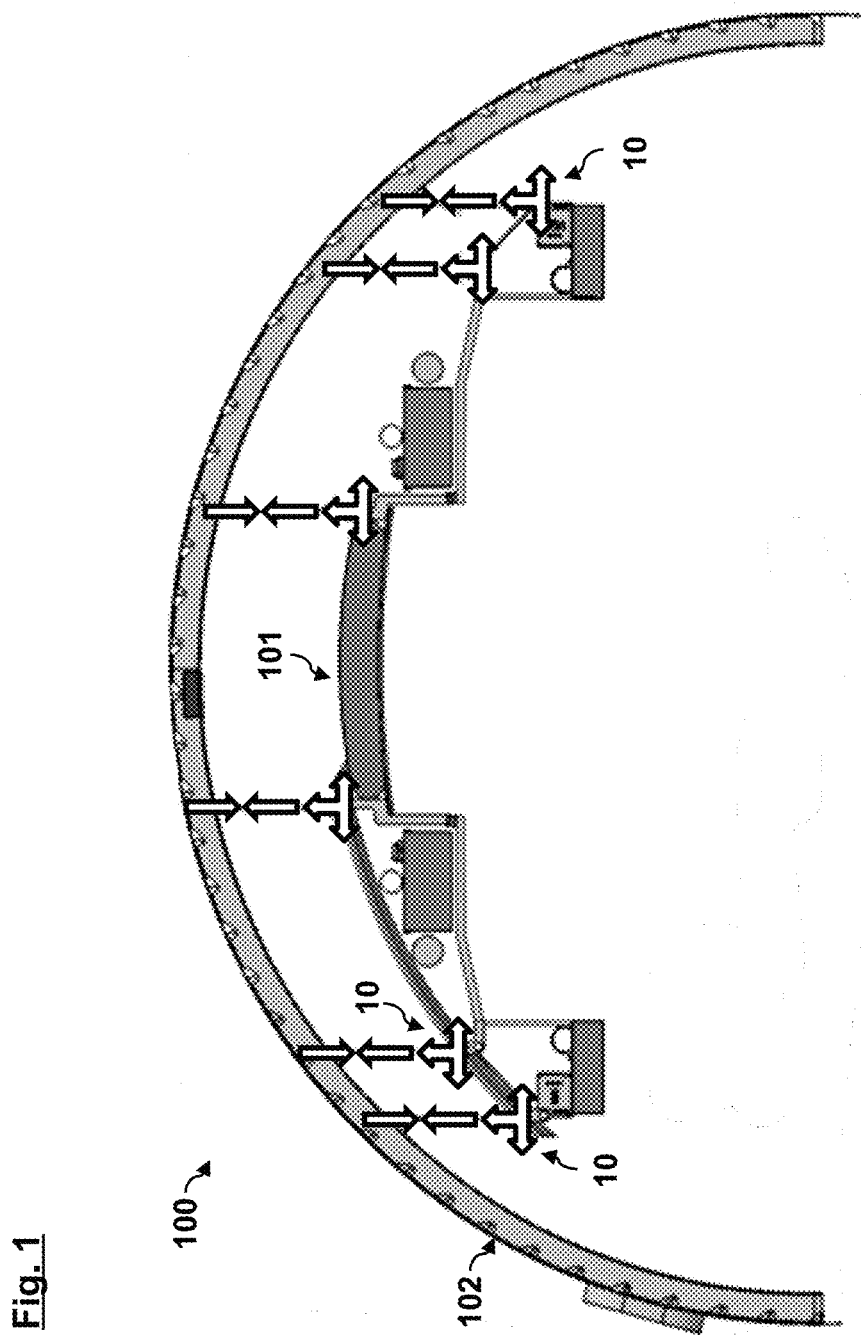

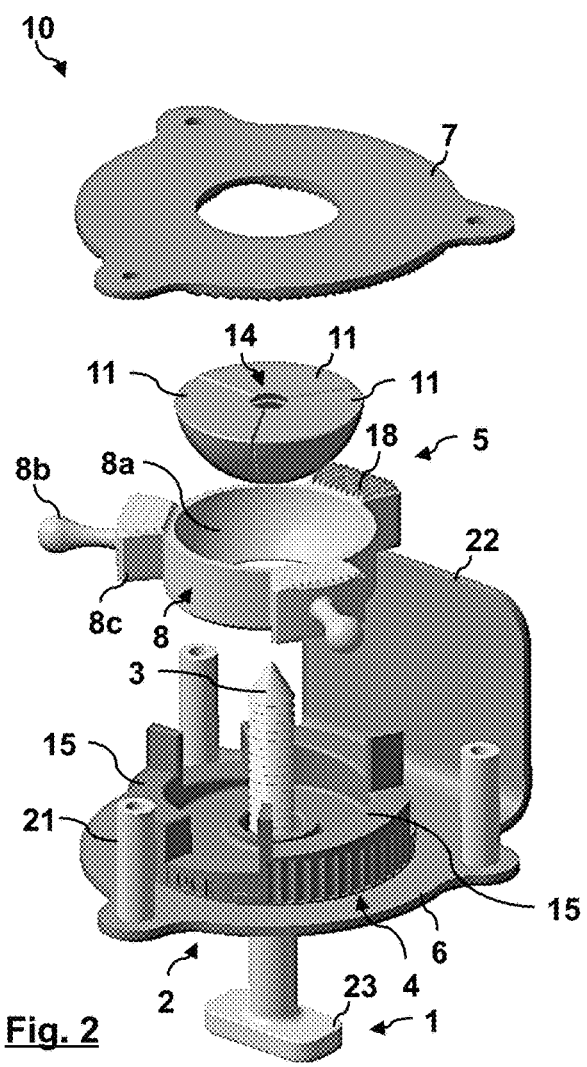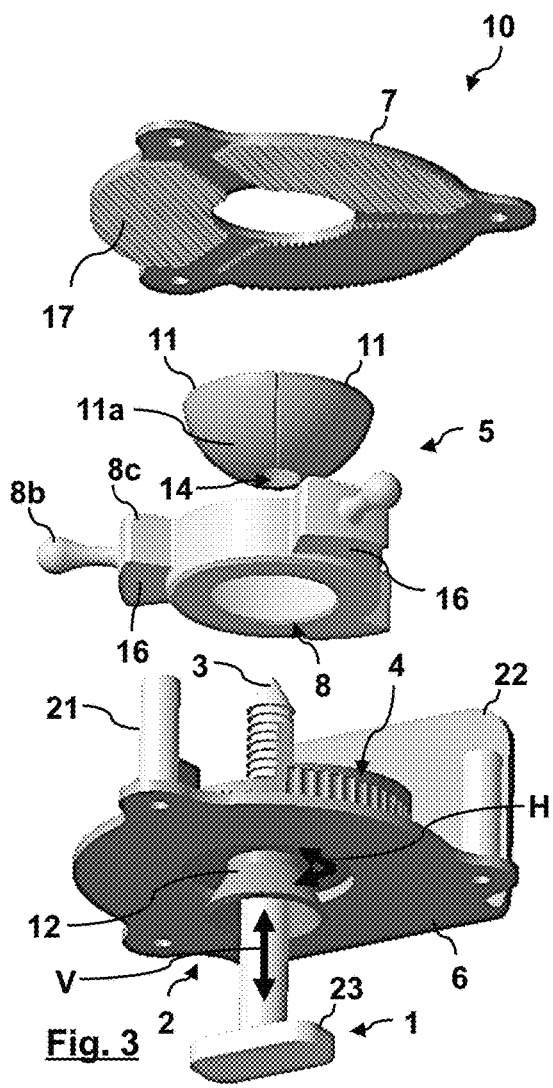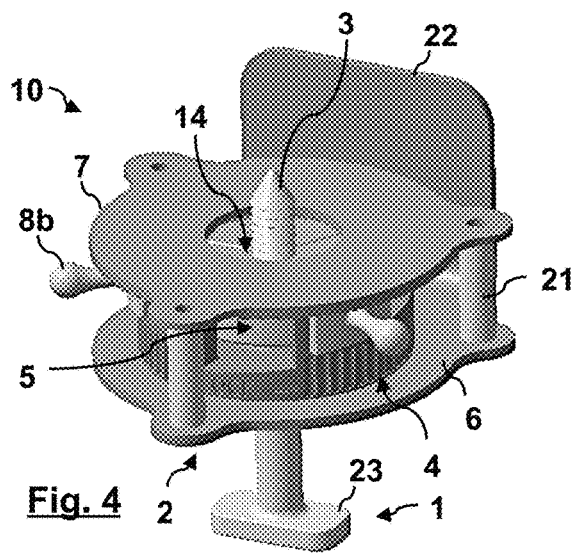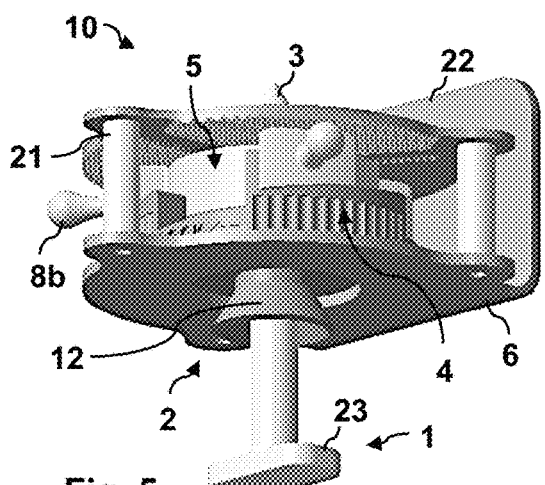

Fig. 12
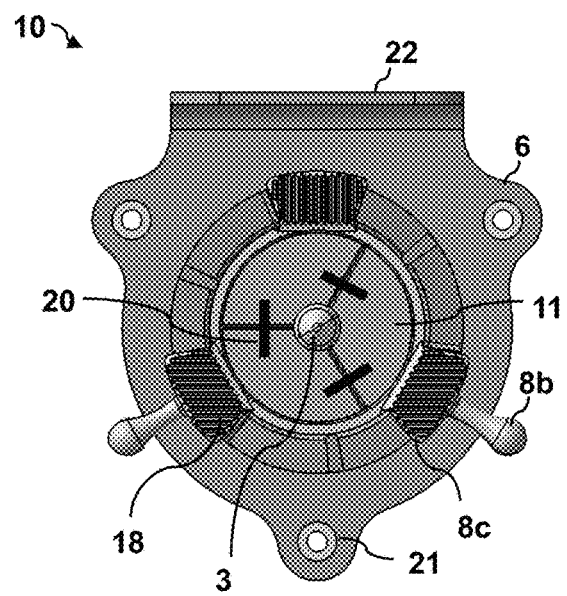
Fig. 13
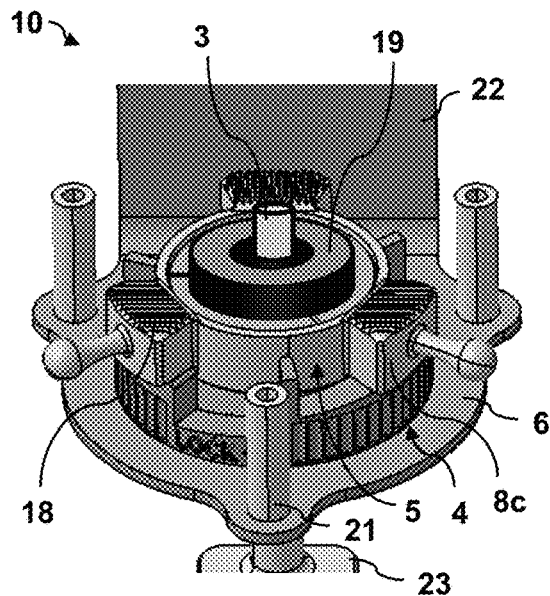
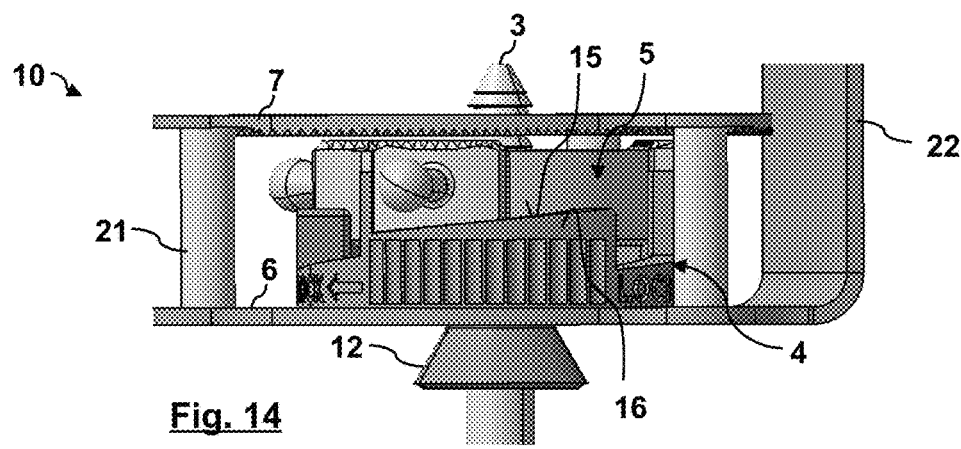
Fig. 14
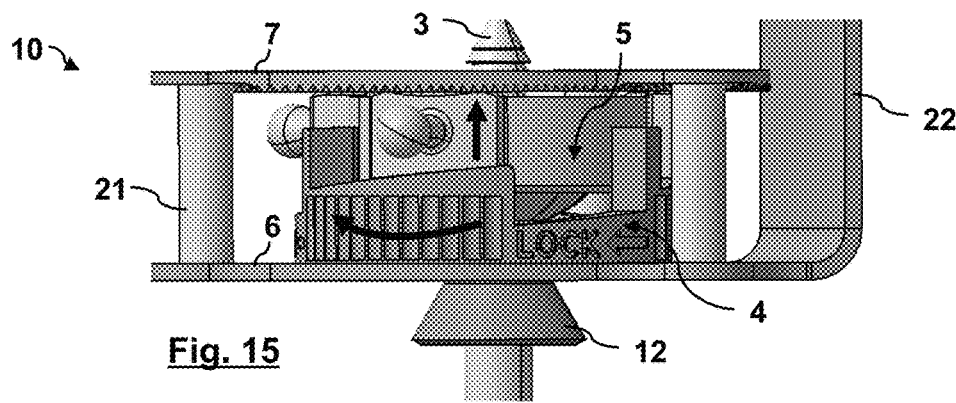
Fig. 15

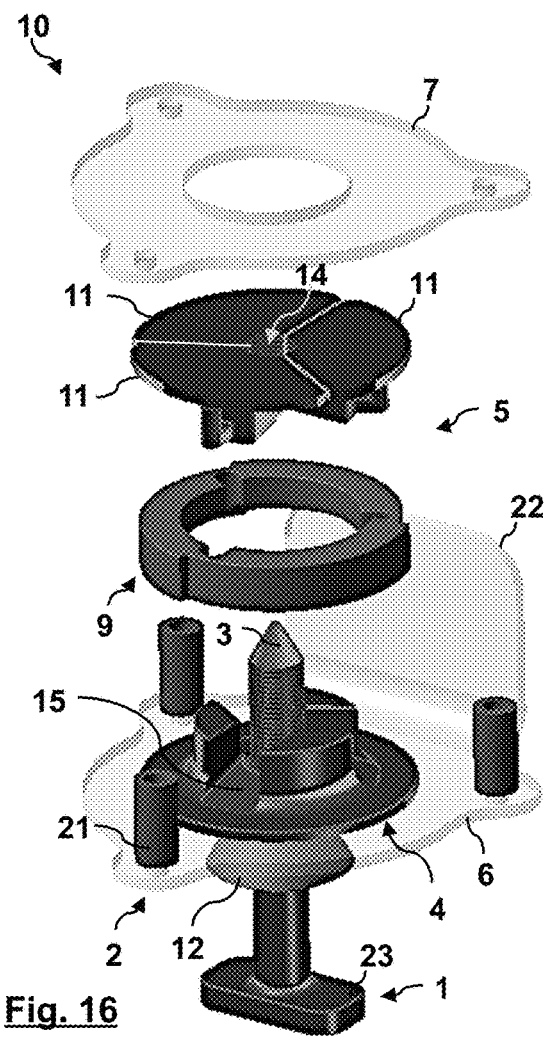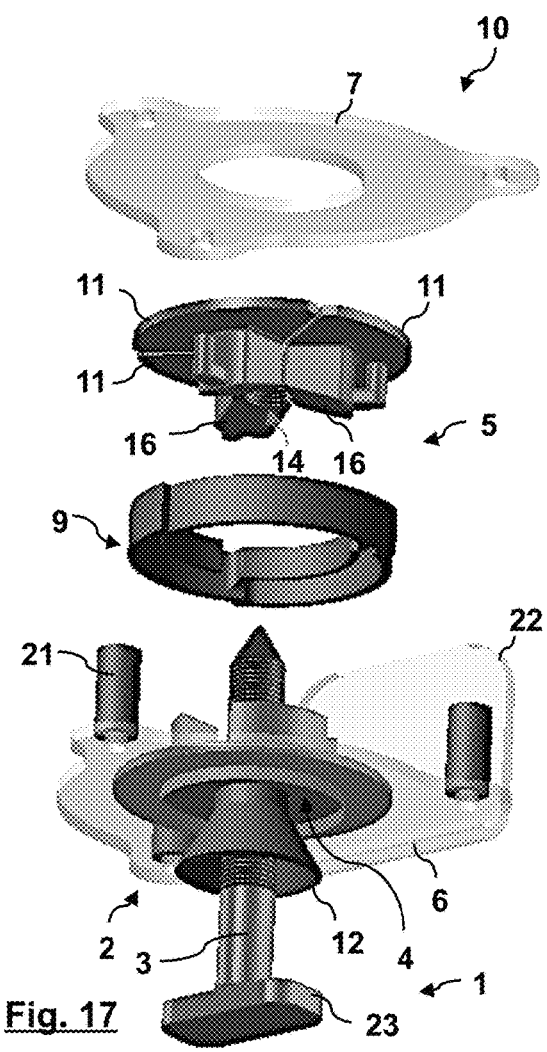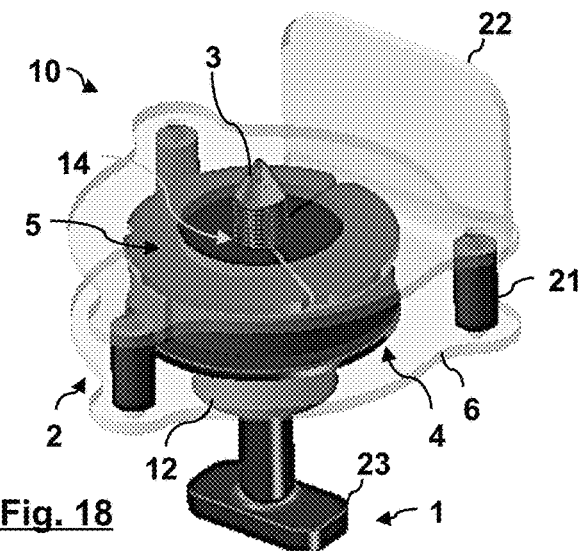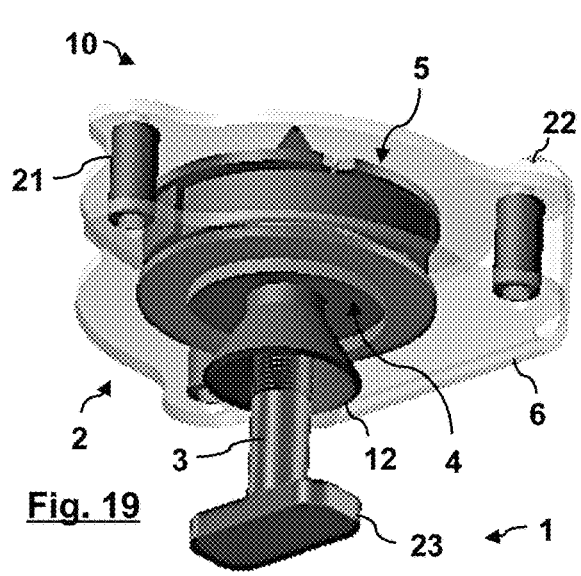

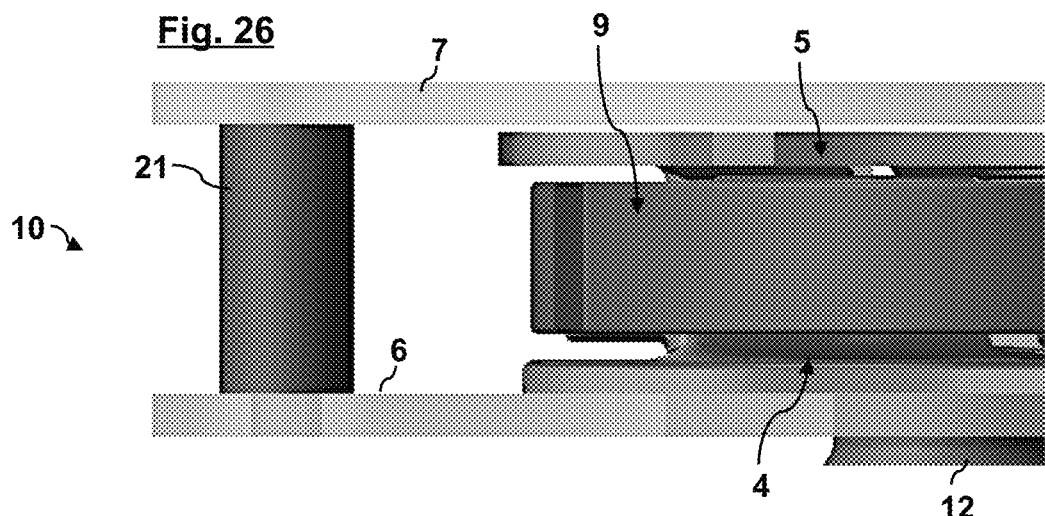
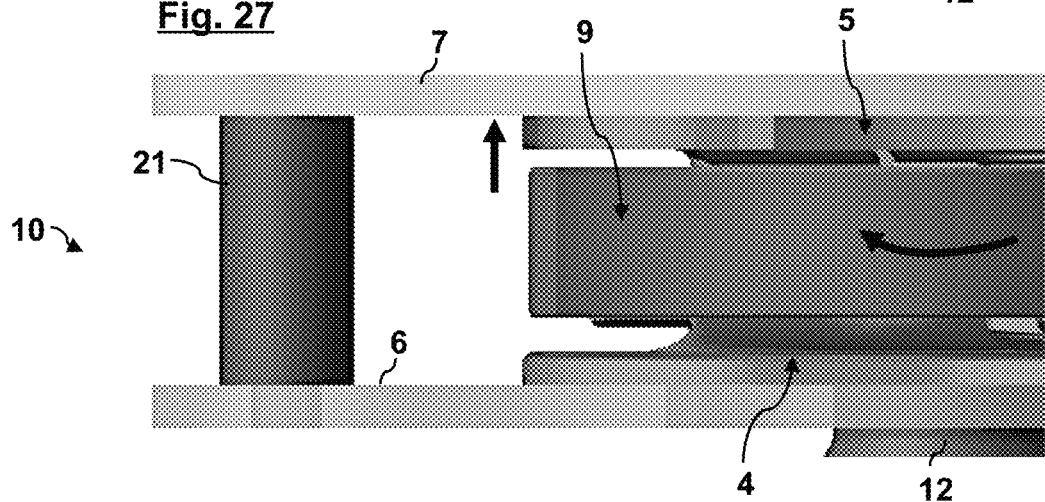
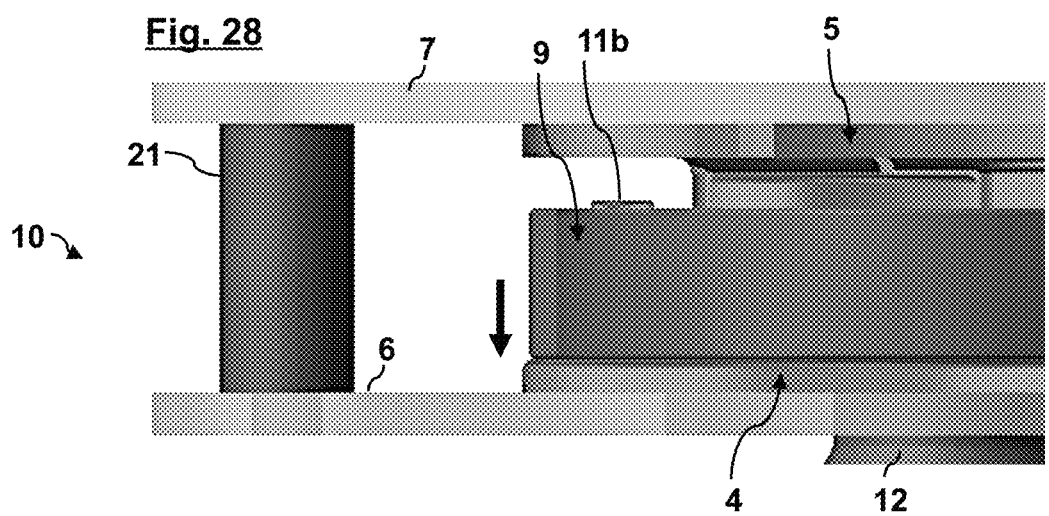

TOLERANCE-COMPENSATING FASTENING ARRANGEMENT FOR FASTENING A COMPONENT TO A STRUCTURE

FIELD OF THE INVENTION

The present invention pertains to a tolerance-compensating fastening arrangement for fastening a component to a structure.

Although it can be used in many applications, the present invention and the problems underlying it are explained in greater detail in relation to passenger aircraft. However, the methods and devices described can likewise be used for affixing a broad variety of components to various structures in different applications. For example, the invention may be used to fasten components to different vehicle structures, e.g. road vehicles, rail vehicles, watercraft and aircraft.

BACKGROUND OF THE INVENTION

The fixation of an object relative to another object is conventionally achieved by a threaded rod affixed to one object and a washer and nut coupled to the other object. In order to provide a particular distance between the objects, one or more spacers are usually employed. However, when installing a plurality of objects along a line, each of the objects has to be affixed with a respective spacer. If a certain tolerance is further to be levelled out, different spacers have to be used for each object. The installation of such a plurality of objects, therefore, becomes cumbersome and time-consuming.

For instance, in a passenger cabin of an aircraft the ceiling above passenger seats may consist of a plurality of different panels, including panels with reading lights, control buttons, security signs and covers for oxygen mask containers. Likewise, a plurality of modules including such panels may be installed when building the interior of the aircraft. Each of these modules or other components having one or more panels to form the ceiling of the passenger cabin may be affixed directly to the primary structure, such as a frame, or an installation bar provided on the primary structure. Alternatively, a specific arrangement of such components may be preassembled outside the aircraft fuselage to form a ceiling module, which may then be moved into the fuselage as one integrated system and mounted to the primary structure as a whole. In both instances however, a configuration of the primary structure or installation structure may vary due to tolerances affecting positions, orientations and/or shapes of components relative to the inside of the fuselage. Thus, if the ceiling would be installed to the primary structure with the same fixation means, each component or portion might be installed at different positions and/or orientations, which is undesirable. The use of different sized spacers, on the other hand, is time-consuming, since the correct spacer has to be found during installation and installed for each module or panel.

Examples for fixing interior components to an aircraft structure can be found, for example, in EP 3 254 967 A1 and EP 3 254 951 A1.

BRIEF SUMMARY OF THE INVENTION

Against this background, aspects of the present invention may relate to finding simple yet effective solutions for fastening a component to a structure taking tolerances into account.

According to an aspect of the invention, a tolerance-compensating fastening arrangement for fastening a component to a structure is provided. The fastening arrangement comprises a male fastener comprising a fastening bolt having a serrated outer profile with a plurality of ridges arranged one after the other along the fastening bolt, each ridge running circumferentially around an outer surface of the fastening bolt. The fastening arrangement further comprises a female fastener, which comprises a socket base arranged within the female fastener movable along a horizontal tolerance compensation plane and having a conical funnel configured to receive the fastening bolt such that horizontal tolerances between the male fastener and the female fastener are compensable by movement of the socket base within the female fastener, the movement being actuated through contact of the fastening bolt with an inner funnel surface of the conical funnel; and a socket jaw arranged on the socket base and comprising several jaw segments arranged circumferentially around a vertical tolerance compensation axis such as to form a central jaw opening configured to receive the fastening bolt through the conical funnel of the socket base, each jaw segment having a serrated inner profile with a plurality of ridges arranged one after the other along the vertical tolerance compensation axis, the jaw segments being configured movable radially with respect to the vertical tolerance compensation axis to adjust a size of the jaw opening to retain the fastening bolt along the vertical tolerance compensation axis via contact of the serrated inner profile and the serrated outer profile and thereby compensate vertical tolerances between the male fastener and the female fastener.

According to a further aspect of the invention, an aircraft or spacecraft has a fastening arrangement according to an embodiment of the invention.

Thus, one idea of the present invention is to provide fastening means with integrated tolerance compensation in all three dimensions. This means that relative positions between the component and the structure may deviate from prescribed dimensions to a certain extent, e.g. up to 1 cm, in each coordinate direction. These deviations are then compensated by the fastening system. The present fastening system is self-finding and thus automatable in the sense that the system finds the mounting configuration on its own due to the fact that the fastening bolt moves the socket base automatically in the horizontal tolerance compensation plane by the required distance just by entering the conical funnel and thereby making contact with the inner funnel surface (tolerance compensation along, e.g., x- and y-coordinates). The fastening bolt may then be retained within the female fastening member at a certain penetration depth (tolerance compensation in, e.g., z-direction). It should be noted that the tolerances between the component and the structure are not eliminated after the connection is formed. In fact, the component and the structure both still hold their individual reference positions after the connection is closed. However, the connection via male fastener and female fastener compensates these tolerances in a very convenient way.

In sum, aspects of the present invention provide the opportunity to affix a component to a structure in a tolerance compensating way, which is reliable and which can be fully automatized. Manual installation steps can thus be avoided. As a result, aspects of the invention may save installation time and costs significantly.

According to an embodiment of the invention, the socket jaw may comprise at least three identical jaw segments.

Three jaw segments may be an optimal compromise between effectiveness and robustness of the fastening system. It is to be understood however that also more than three jaw segments may be utilized, e.g. four, five or even more segments, which may or may not be identical. In principle, also solutions based on merely two jaw segments may be suitable for certain applications. Also in this case the jaw segments may be configured identical.

According to an embodiment of the invention, each ridge of the serrated outer profile of the fastening bolt may have an inclined top face and a horizontal bottom face. The serrated inner profile of the jaw segments may be complementary serrated to the serrated outer profile of the fastening bolt.

This arrangement of an inclined top surface and a horizontal bottom surface may be used, for example, to provide a self-closing and/or self-locking snap-in arrangement, where the fastening bolt may be pushed into the jaw opening between the jaw segments as a far as required—thereby repeatedly pushing the jaw segments radially outwards with the inclined top faces of the ridges—and finally snap into a position, in which the ridges of the fastening bolt engage the corresponding ridges on the jaw segments. As long as any radial movement of the jaw segments is prohibited after that, the bolt will thus be locked within the socket jaw, as the horizontal bottom faces of the ridges block any movement of the fastening bolt in the backward direction.

According to an embodiment of the invention, the inclined top face may have an inclination angle of 60°.

However, it will be clear to the person of skill that other configurations may have advantages in certain application, e.g. configurations having inclination angles larger or smaller than 60°. In principle, the inclination of the individual ridges may even vary along the fastening bolt. The serration may follow a certain standard, e.g. a standard 60° serration according to NSA 509.03 with a pitch of 1 mm between the individual ridges. Such a serration is simple to manufacture with standard tools.

According to an embodiment of the invention, the female fastener may further comprise a base plate, on which the socket base is slidably arranged. The female fastener may further comprise a cover plate above the socket jaw. The socket base may comprise a wedged turning surface and the socket jaw may comprise a complementary wedged turning surface. The socket jaw may slidably rest with the complementary wedged turning surface on the wedged turning surface of the socket base such that the socket jaw is pressable against the cover plate by relative rotation of the socket base and the socket jaw at the wedged turning surfaces around the vertical tolerance compensation axis to block movement of the socket base and the socket jaw with respect to the base plate and the cover plate.

The base plate and the cover plate may both be affixed in position, e.g. firmly attached to a bracket or similar that is connected to the structure, and may thus together form a retaining or support structure of the female fastener. By means of the wedged turning surfaces a simple and yet effective closing mechanism is provided for the fastening system that makes it possible to fix the positions of male and female fasteners relative to each other, in particular within the horizontal tolerance compensation plane, by pressing the socket jaw against the cover plate (force fit) and thereby also blocking movement of the socket base along the horizontal plane.

In principle, both components, that is, the socket jaw and the socket base, may be locked within the respective open and/or closed position by a suitable mechanism. For example, the wedged surfaces may further be configured with an additional serration, which may be orientated and/or configured such that relative (sliding) movement of the wedged surfaces is only possible in one direction of rotation.

According to an embodiment of the invention, the cover plate may have a serrated lower surface and the socket jaw may have a serrated upper surface complementary formed to the serrated lower surface of the cover plate.

In this embodiment, the serrated faces of the cover plate and the socket jaw may additionally help to block any relative, e.g. sliding, movement between the socket jaw and the cover plate. For example, if such sliding movement can be blocked merely on basis of friction in the closed state (without or with minor loads), then the additional serration may be omitted. However, under certain circumstances the additional serration may help to further secure the system in the closed state.

According to an embodiment of the invention, the socket jaw may further comprise a jaw bowl, the jaw bowl having a concave bearing surface and the jaw segments having a convex bearing surface configured to slidably mount the jaw segments within the jaw bowl such that angular tolerances between the male fastener and the female fastener are compensable by sliding movement of the fastening bolt together with the jaw segments within the jaw bowl.

The system thus not only provides an interface for blind and automated installation of components with integrated tolerance compensation in three perpendicular directions, namely x-, y- and z-direction. In addition, angular tolerances may be compensated to some extent, e.g. several degrees. To this end, the socket jaw and the fastening bolt together form a rotary joint inspired by a ball-and-socket joint type. The stationary part of the joint is formed by the concave jaw bowl, which may have, for example, a basically (at least partly) spheroid concave surface. The movable part of the joint is formed by the fastening rod engaging the jaw segments, wherein the latter may have a basically (at least partly) spheroid convex surface. The basic shape of the convex surface may principally correspond to the shape of the concave surface of the stationary part so that both connection parts may be brought in contact with each other at the bearing surfaces. The touching convex and concave surfaces may then move in a sliding manner with respect to each other, similar to a ball-and-socket connection, at least in a limited angular range relative to the vertical tolerance compensation axis, e.g. up to several degrees, e.g. between 0° and 5° or 10°.

It should be noted in this respect that the sliding movement of the jaw segments within the jaw bowl also provides movement of the jaw segments in radial direction for adjusting the size of the jaw opening.

According to an embodiment of the invention, the concave bearing surface of the jaw bowl and the convex bearing surface of the jaw segments may be configured basically spheroid.

Basically (at least partly) spheroid bearing surfaces represent one particularly simple and elegant example for a system of concave and convex surfaces, which is based on classical ball-and-socket joints.

However, according to an alternative embodiment of the invention, the concave bearing surface of the jaw bowl and the convex bearing surface of the jaw segments may be configured basically conical.

Thus, instead of a ball-like configuration, also other shapes for the concave and convex bearing surfaces may be conceived. A conical shape provides one such alternative example.

According to an embodiment of the invention, the curvature of the concave bearing surface of the jaw bowl corresponds to the curvature of the convex bearing surface of the jaw segments.

This enables the implementation of a smooth contact between the two movable parts, thereby reducing the inner friction within the "joint".

According to an embodiment of the invention, the female fastener may comprise a cover plate above the socket jaw and the socket jaw may comprise a spring element configured to resiliently preload the jaw segments against the cover plate.

Such a spring element may prohibit any unwanted movement of the jaw segments along the vertical tolerance compensation axis, for example after the fastening arrangement is locked in position. Otherwise, minor movements of the jaw segments might lead to vibrations and/or fatigue problems, e.g. during flight of an aircraft, in which the components are installed. In the present embodiment, the jaw segments are constantly pushed down by the spring element with a suitable predefined force such that any further movements after closing the system are suppressed.

According to an embodiment of the invention, the socket jaw may further comprise a retainer ring around the vertical tolerance compensation axis. The retainer ring may be configured with a sliding track of variable radius for each jaw segment, in which the respective jag segment is slidably mounted to facilitate radial movement of the jaw segment with respect to the vertical tolerance compensation axis by rotation of the retainer ring around the vertical tolerance compensation axis.

The retainer ring thus provides a very simple to use yet effective solution to facilitate radial movement of the jaw segments in a controlled and guided way. In one particular example, three identical jaw segments may be provided, each of which may be mounted in an associated sliding track within the retainer ring. By turning the retainer ring by 90° (for example) each jaw segment is moved along the sliding track and thereby moved radially either inwards or outwards depending on the direction of rotation. The range of the radial movement can be configured accordingly such that the jaw opening can be opened and closed around the fastening bolt appropriately.

According to an embodiment of the invention, each sliding track may be configured with a lock slot at a radially inward end position and each jaw segment may be configured with a lock bolt complementary formed to the lock slot to lock the jaw segments at the radially inward end position within the retainer ring.

The embodiment thus provides a simple locking mechanism that allows one to fixate the fastening arrangement along the transverse tolerance compensation axis by simple turn of the retainer ring. To this end, the retainer ring may have a control surface, a handle or similar at an radially outward portion by means of which a user may grab and turn the retainer ring. Alternatively or additionally, it is of course possible to provide an actuation system to avoid the need for manual access.

According to an embodiment of the invention, the retainer ring may be configured to lock the jaw segments by shifting along the vertical tolerance compensation axis.

Thus, operation of the retainer ring may involve two steps: first, the ring may be turned, e.g. by 90°, in order to close the jaw opening and thus engage the fastening bolt with the jaw segments, thereby fixating the system along the vertical tolerance compensation axis. In a second step, the ring may then be shifted either downwards or upwards along the vertical tolerance compensation axis to lock the jaw segments in their current positions and thus lock the system in vertical direction.

According to an embodiment of the invention, the component may comprise several male fasteners and the structure may comprise corresponding female fasteners.

For example, an integrated ceiling module for an aircraft may be affixed to a primary fuselage structure by utilizing several of the present fasteners per frame, that is, per transverse circumferentially running stiffening element of the fuselage. In one particular example, six fasteners may be used to fasten the ceiling module to one such frame. The aircraft may comprise 50 frames so that overall 300 fasteners are required to fix the ceiling module to the aircraft structure. Despite this exemplary large number of individual fasteners, the component (the ceiling module) may still be installed within a few hours due to the self-finding and automatized tolerance compensating nature of the present system. In principle, it is possible to employ several different embodiments of male and female fasteners at the same time, e.g. because certain fastener solutions may be more suitable for fixing certain aircraft parts.

The invention will be explained in greater detail with reference to exemplary embodiments depicted in the drawings as appended.

BRIEF DESCRIPTION OF THE DRAWINGS

The accompanying drawings are included to provide a further understanding of the present invention and are incorporated in and constitute a part of this specification. The drawings illustrate the embodiments of the pres-ent invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

FIG. 1 shows a cross-sectional view of an aircraft with a fastening arrangement according to an embodiment of the invention.

FIG. 2 is an exploded perspective top view of a fastening arrangement as used in FIG. 1.

FIG. 3 shows the fastening arrangement of FIG. 2 in an exploded view from below.

FIG. 4 depicts the fastening arrangement in the perspective of FIG. 2 in an assembled configuration.

FIG. 5 shows the fastening arrangement in the perspective of FIG. 3 in an assembled configuration.

FIG. 12 corresponds to a modified version of the fastening arrangement of FIGS. 2-4 in a top view.

FIG. 13 is a modified version of the fastening arrangement of FIGS. 2-4 in a perspective side view.

FIGS. 14 and 15 show the fastening arrangement of FIGS. 2-4 in side view during successive assembly steps.

FIG. 16 is an exploded perspective top view of an alternative fastening arrangement used in FIG. 1.

FIG. 17 shows the fastening arrangement of FIG. 16 in an exploded view from below.

FIG. 18 depicts the fastening arrangement in the perspective of FIG. 16 in an assembled configuration.

FIG. 19 shows the fastening arrangement in the perspective of FIG. 17 in an assembled configuration.

FIGS. 26 to 28 depict the fastening arrangement of FIGS. 16-19 in side view during successive assembly steps.

DETAILED DESCRIPTION

Figure 6:
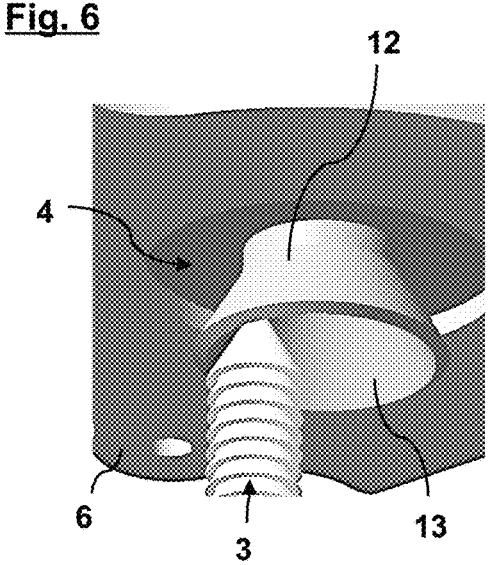
FIGS. 6 and 7 are detailed views of the fastening arrangement of FIGS. 2-4 during assembly.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Some of the components, elements and assemblies as disclosed hereinforth may be fabricated using free form fabrication (FFF), direct manufacturing (DM), fused deposition modelling (FDM), powder bed printing (PBP), laminated object manufacturing (LOM), stereolithography (SL), selective laser sintering (SLS), selective laser melting (SLM), selective heat sintering (SHS), electron beam melting (EBM), direct ink writing (DIW), digital light processing (DLP) and/or additive layer manufacturing (AM). Those techniques belong to a general hierarchy of additive manufacturing (AM) methods. Often termed as 3D printing, those systems are used for generating three-dimensional objects by creating a cross-sectional pattern of the object to be formed and forming the three-dimensional solid object by sequentially building up layers of material. Any of such procedures will be referred to in the following description as AM or 3D printing without loss of generality. AM or 3D printing techniques usually include selectively depositing material layer by layer, selectively fusing or solidifying the material and removing excess material, if needed.

3D or AM techniques may be used in procedures for building up three-dimensional solid objects based on digital model data. 3D/AM employs an additive process where layers of material are sequentially built up in different shapes. 3D/AM is currently used for prototyping and distributed manufacturing with multiple applications in engineering, construction, industrial design, automotive industries and aerospace industries.

FIG. 1 shows a cross-sectional view of an aircraft 100 with a fastening arrangement 10 according to an embodiment of the invention.

The aircraft 100 depicted in FIG. 1 may be a passenger plane, for example. A fuselage of a typical passenger plane consists of a rigid framework of stiffening elements that is covered by a skin. The framework comprises a series of frames/formers bent into a circumferential direction according to the shape of the fuselage cross section and a plurality of longitudinal stringers/longerons that are joined to the frames. Inside the fuselage, a plurality of cross beams for supporting a cabin floor may be arranged one after the other in the longitudinal direction of the aircraft 100, each cross beam extending in a cross direction and being attached on both ends to the frames and/or stringers. The cross beams may further be supported by vertical struts and so on. All of these components are part of a so-called primary structure 102, which provides the elements for stiffing the overall structure of the aircraft 100. The components of the primary structure 102 are usually fastened to each other by rivets or similar means in the course of a major component assembly of the aircraft 100.

One approach for installing a cabin ceiling in such an aircraft 100 may include preassembling an integrated ceiling module or component 101 outside the fuselage of the aircraft 100. Such a ceiling module may comprise amongst others the corresponding ceiling substructure of pipes, supply lines, cables, conduits, compartments, structural connectors and so on. In a second installation step, the ceiling module 101 may then be moved into the fuselage of the aircraft 100 as a whole and fastened to the primary structure 102 of the aircraft 100 in one run by means of a fastening arrangement 10 comprising a multitude of male fasteners 1 and corresponding female fasteners 2. The male fasteners 1 may be provided on the ceiling component 101 and the female fasteners 2 may be provided on the primary structure 102 of the aircraft 100, e.g. several on each frame (cf. FIG. 1). It is to be understood however that male and female fasteners 1, 2 may be interchanged and that at least some of the male fasteners 1 may be provided as well on the structure 102 and the corresponding female 2 fasteners accordingly on the component 101. In order to install the component 101 on the structure 102, the component 101 may be moved by a jig/tool (not shown in the figures), which may position the respective male fasteners 1 relative to the female fasteners 2 and move the male fasteners 1 simultaneously and/or successively into the female fasteners 2 to close the connection (cf. arrows in FIG. 1).

The position and alignment of the fasteners 1, 2 may now vary due to tolerances of the aircraft parts, which in turn may affect positions, orientations and/or shapes of installed ceiling parts relative to the inside of the fuselage in case these tolerances are not compensated. For example, ceiling panels may be installed at different heights, i.e. different distances to a cabin floor, which is undesirable, since passengers and aircraft operators prefer a flush ceiling. With references to FIG. 2 ff., various embodiments of fastening arrangements 10 will now be described that may be used in the system of FIG. 1 to automatically compensate such tolerances.

FIGS. 2 to 4 show one embodiment of such a tolerance-compensating fastening arrangement 10 for fastening the component 101 to the structure 102 according to an exemplary embodiment of the invention. FIGS. 6 to 15 depict further views of the fastening arrangement 10 and of its parts during assembly.

Specifically, each male fastener 1 comprises a fastening bolt 3 having a serrated outer profile with a plurality of ridges 3a arranged one after the other along the fastening bolt 3, each ridge 3a running circumferentially around an outer surface of the fastening bolt 3 (cf. FIGS. 8-11 in particular). Each ridge 3a of the serrated outer profile of the fastening bolt 3 has an inclined top face 3b with an inclination angle of 60° and a horizontal bottom face 3c (cf. FIG. 9). The ridges 3a may be displaced from each other with a pitch of 1 mm or similar. The fastening bolt 3 may be affixed to a component-side bracket 23 of the male fastener 1, which is firmly attached to the component 101.

In a similar vein, each female fastener 2 is attached to the structure 102 via a structure-side bracket 22. The structure-side bracket 22 has a portion that serves as an affixed base plate 6 of the female fastener 2 (cf. FIGS. 2 to 4, for example). The base plate 6 is connected via several spacers 21 to a cover plate 7 of the female fastener 2. The base plate 6 and the cover plate 7 together serve as a structural housing of the female fastener 2, in which the further parts are accommodated.

Figure 7:
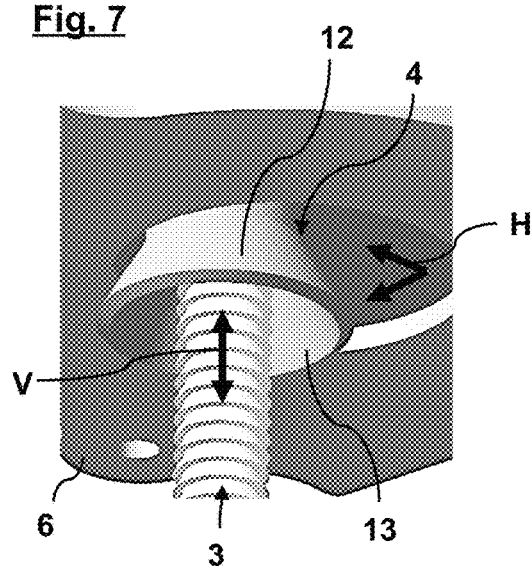
Figure 8:
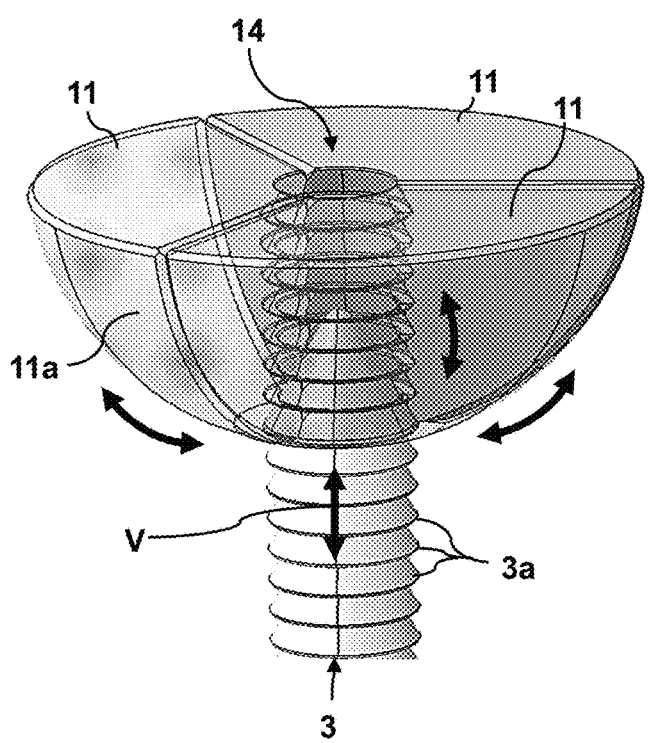
FIG. 8 shows another detailed view of the fastening arrangement of FIGS. 2-4 during assembly.

Further, the female fastener 2 comprises a socket base 4 arranged on the base plate 6 within the female fastener 2 such that the socket base 4 is slidable along a horizontal tolerance compensation plane H across the base plate 6 (cf. FIG. 7 in particular). The socket base 4 has a conical funnel 12, which opens downwards and protrudes through a circular opening in the base plate 6, whereby a diameter of the opening is larger than a diameter of the conical funnel 12 such that the socket base 4 can still be moved across the base plate 6. The expansion/diameter of the opening in the base plate 6 thus defines a range over which the socket base 4 is slidable across the base plate 6. The conical funnel 12 is configured to receive the fastening bolt 3 such that horizontal tolerances between the male fastener 1 and the female fastener 2 are compensable to a certain extent by movement of the socket base 4 within the female fastener 2, the movement being actuated through contact of the fastening bolt 3 with an inner funnel surface 13 of the conical funnel 12.

The working principle of this horizontal tolerance compensation is illustrated in FIGS. 6 and 7. When the male fastener 1 is offset in the horizontal tolerance compensation plane H with respect to the female fastener 2, which means that the fastening bolt 3 of the male fastener 1 is not perfectly aligned with the conical funnel 12 of the female fastener 2, the fastening bolt 3 will contact the inner funnel surface 13 of the conical funnel 12 as soon as it enters the funnel 12 from below during installation of the fastening arrangement 10. This can be seen in FIG. 6, which shows the bolt 3 in its reference (target) position within the horizontal plane (e.g. x-y-coordinates). The position of the fastening bolt 3 may, for example, be set by a jig or respective tooling on the component 101. The position of the base plate 6, and thus of its opening, is determined on the other hand by the primary structure 102 position.

With reference to FIG. 7, it can be seen that due to the conical shape of the inner funnel surface 13 any upward movement of the fastening bolt 3 into the conical funnel 12 will push the socket base 4 along the base plate 6 accordingly until the fastening bolt 3 is entirely aligned with the opening of the conical funnel 12 (or until the conical funnel 12 touches the rim of the circular opening and thus the maximal compensable tolerance range). Hence, tolerances within the horizontal plane H can be compensated within a range that is predefined by the geometric configuration of base plate 6 and socket base 4. In one particular example, deviations of up to ±10 mm may be compensated within the horizontal plane H by the arrangement 10. However, the exact range may be scaled according to the respective application and particular need by increasing/decreasing the elements accordingly, in particular the geometry of the conical funnel 12 and the size of the opening within the base plate 6.

The above procedure can be automated because all involved elements are forced into the correct target position by the conical funnel 12. On top of that, the installation can be done blindly because the elements find their right installation position by themselves, i.e. the connection is self-finding.

Again referring to FIGS. 2 to 4, the female fastener 2 further comprises a socket jaw 5 arranged on the socket base 4. One technical purpose of the socket jaw 5 is to receive the fastening bolt 3 through the conical funnel 12 and fix its position along a vertical tolerance compensation axis V, which is oriented perpendicular on the horizontal tolerance compensation plane H, and thereby compensate vertical tolerances between the male fastener 1 and the female fastener 2.

To this end, the socket jaw 5 comprises three jaw segments 11 arranged circumferentially around the vertical tolerance compensation axis V such as to form a central jaw opening 14 configured to receive the fastening bolt 3 through the conical funnel 12 of the socket base 4. In order to engage the fastening bolt 3, each jaw segment 11 has a serrated inner profile with a plurality of ridges 11c arranged one after the other along the vertical tolerance compensation axis V and configured complementary to the ridges 3a of the fastening bolt 3. In order to lock the position of the fastening bolt 3 along the vertical tolerance compensation axis V, the jaw segments 11 are configured movable radially with respect to the vertical tolerance compensation axis V to adjust a size of the jaw opening 14 to retain the fastening bolt 3 along the vertical tolerance compensation axis V via contact of the serrated inner profile and the serrated outer profile.

The socket jaw 5 of this embodiment not only serves to compensate vertical tolerances. Another purpose of the socket jaw 5 is to provide compensation of angular tolerances. To this end, the socket jaw 5 is configured with a jaw bowl 8 having a basically spherical concave bearing surface 8a. Accordingly, the jaw segments 11 have a basically spherical convex bearing surface 11a on a lower side. Together, the bearing surfaces 8a, 11a are configured to slidably mount the jaw segments 11 within the jaw bowl 8 such that angular tolerances with respect to the vertical tolerance compensation axis V between the male fastener 1 and the female fastener 2 are compensable by sliding movement of the fastening bolt 3 together with the jaw segments 11 within the jaw bowl 8 (cf. arrows in FIG. 8, the jaw bowl 8 not being visible in the figure).

Figure 9:
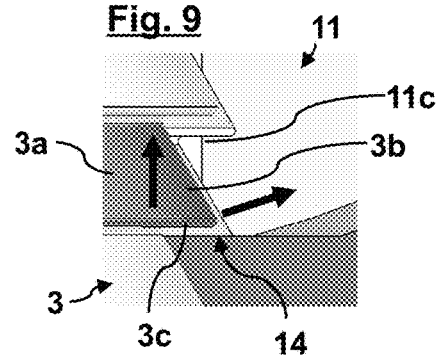
FIGS. 9 to 11 schematically depict the aspects of FIG. 8 in cross-sectional view during successive assembly steps.
Figure 10:
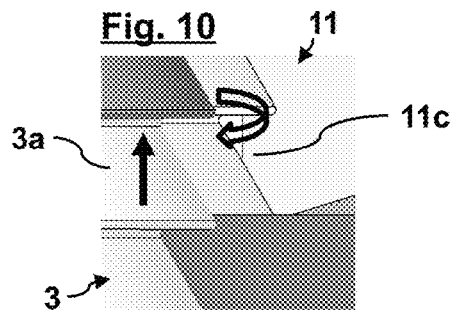
Figure 11:
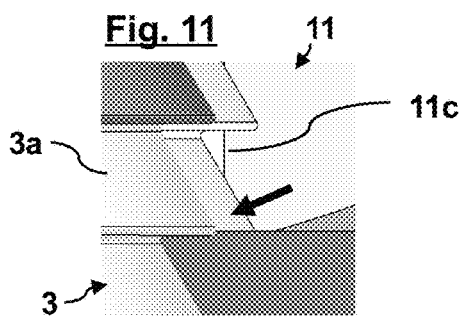

FIGS. 9 to 11 illustrate how the fastening bolt 3 is introduced into the jaw opening 14 between the jaw segments 11 and then pushed upwards along the vertical tolerance compensation axis V. By lifting the fastening bolt 3 upwards in FIG. 9 the respective jaw segments 11 are pushed upwards and radially outwards through the contact of the inclined top face 3b of the ridges 3a of the fastening bolt 3 and the respective faces of the ridges 3c of the jaw segment 11. Due to the convex bearing surfaces 11a on the outside of the jaw segments 11, the jaw segments 11 thus slide along the concave bearing surface 8a of the jaw bowl 8. As soon as the jaw segment 11 passes an outer edge of the ridges 3a of the fastening bolt 3, the direction of movement of the jaw segments 11 switches from radially outwards to inwards (cf. FIG. 10), and the jaw segments 11 begin to fall down (free from the fastening bolt 3) along the bearing surface 8a of the jaw bowl 8 (cf. FIG. 11) until they are caught by the subsequent ridge 3a of the upwards moving fastening bolt 3 and are then pushed up and outwards once more. This procedure continues until the fastening bolt 3 finds its final position along the vertical tolerance compensation axis V.

It should be noted that the jaw segments 11 are forced back into their radial inward (start) position on their own, that is, by their weight. Hence, a spring element or similar is not necessarily required for the above mechanism to work. Due to the horizontal bottom face 3c of the fastening bolt's 3 ridges 3a, the serration of the system is self-closing or self-locking in the sense that once the fastening bolt 3 is moved into the jaw opening 14, the engagement of outer serration and inner serration is closed and the bolt 3 cannot be moved backwards anymore (at least not on its own). Moreover, due to the rotational symmetry of fastening bolt 3 and socket jaw 5, the fastening arrangement 10 is insensitive to rotational misalignment between the male fastener 1 and the female fastener 2.

As described above, movement of the fastening bolt in vertical direction V is automatically adjusted dependent on a vertical offset or tolerance between the male fastener 1 and the female fastener 2, wherein the fastening bolt 3 locks itself in vertical direction V by itself. However, the system also provides a means to lock the arrangement 10 within the horizontal plane H, as will be described now.

To this end, the socket base 4 comprises a wedged turning surface 15 and the socket jaw 5 comprises a complementary wedged turning surface 16 for each jaw segment 11. More specifically, the socket base 4 has an annular shape with a rim structure, on which the wedged turning surface 15 is provided in three azimuthally oriented surface segments, each surface segment corresponding to one jaw segment 11. The complementary wedged turning surface 16 on the other hand is provided at a lower side of the jaw bowl 8. More precisely speaking, three bowl protrusions 8c are provided radially outside on the jaw bowl 8, each of which having one complementary wedged turning surface 16 on a bottom side (cf. FIG. 3), via which the socket jaw 5 slidably rests on the wedged turning surface 15 of the socket base 4. The socket jaw 5 can now be pushed against the cover plate 7 by relative rotation of the socket base 4 and the socket jaw 5 at the wedged turning surfaces 15, 16 around the vertical tolerance compensation axis V to block movement of the socket base 4 and the socket jaw 5 with respect to the base plate 6 and the cover plate 7.

This mechanism to block horizontal movement of the inner parts of the female fastener 2 is illustrated in FIGS. 14 and 15. In FIG. 14, the socket jaw 5 is spaced apart from the cover plate 7 and thus the system of socket base 4 and socket jaw 5 riding on top of the socket base 4 can be slid across the base plate 6 along the horizontal tolerance compensation plane H. In FIG. 15 the socket base is now turned clockwise (as seen from top of the fastening arrangement 10, cf. "lock" direction in FIG. 15), which pushes the socket jaw 5 upwards against the cover plate 7 (cf. arrows in FIG. 15). It should be noted in this respect that the rotational movement of the socket base 4 is possible even when the fastening bolt 3 is inserted into the system due to the rotational symmetry of the arrangement, and in particular the fastening bolt 3, around the vertical axis V.

In order to complement this force fit between socket jaw 5 and cover plate 7, the cover plate 7 has a serrated lower surface 17 and the socket jaw 5 has a serrated upper surface 18 complementary formed to the serrated lower surface 17 of the cover plate 7. Hence, both components are not only hold together by friction but also by engagement of the serrated surfaces in a form fit.

As can be seen in FIG. 12, the ridges/teeth of the serrated surfaces may be aligned appropriately in order to make sure that the jaw bowl 8 always keeps the same position (the teeth on the serrated upper surface 18 of the jaw bowl 8 have to be aligned with the complementary teeth of the lower serrated surface 17 of the cover plate 7). In the particular example of FIG. 12, the teeth on one of the bowl protrusions 8c (top in FIG. 12) are oriented perpendicular to the ones on other tow lower bowl protrusions 8c (bottom of FIG. 12) within the horizontal plane H. Hence, the respective teeth block sliding movement along one axis within the plane H.

As can be seen in FIG. 12, for example, the jaw bowl 8 further comprises two bowl handles 8b, which may be used to engage and hold the jaw bowl 8 from the outside, e.g. in order to fix it in its position relative to base plate 6 and cover plate 7. It will be clear to the person of skill that the serration of the cover plate 7 and the jaw bowl 5 as well as the bowl handles 8b can be omitted in case that the sliding movement can be blocked by friction alone.

As described above, the bearing surfaces 8a, 11a of the female fastener 2 have a basically spheroid shape. However, the person of skill will readily acknowledge that other shapes may be suitable in some applications. For example, in other embodiments the concave bearing surface 8a of the jaw bowl 8 and the convex bearing surface 11a of the jaw segments 11 may be configured basically conical, for example.

Still referring to FIG. 12, the female fastener 2 may optionally comprise segment connectors 20 for coupling the individual jaw segments 11 with each other in order to provide an improved synchronized movement of the jaw segments 11 and to avoid uncontrolled movements in vertical direction. The segment connectors 20 may be configured appropriately to allow the desired movement of the segments 11 and to block all unwanted degrees of freedom. For example, the jaw segments 11 may be coupled to each other via a tongue-and-groove connection. In a similar vein, an additional locking element may be implemented to lock the angular tolerance compensation.

Now referring to FIG. 13, an additional (central) spring element 19 may optionally be provided between the cover plate 7 and the jaw segments 11 as part of the socket jaw 5. The spring element 19 may be configured to resiliently preload the jaw segments 11 against the cover plate 7 in vertical direction, i.e. along the vertical tolerance compensation axis V. Based on this provision, any movement of the jaw segments 11 in vertical direction can be suppressed, e.g. to avoid vibrations after installation of the system due to a remaining free play in vertical direction.

With reference to FIGS. 16 to 28, an alternative embodiment of the fastening arrangement 10 is described now, which can also be used to fix the component 101 to the structure 102 in FIG. 1. In principle, both embodiments can be used in combination to fix components to a structure by utilizing male fasteners and female fasteners of both embodiments in one fastening arrangement.

The fastening arrangement 10 of FIGS. 16 to 28 also comprises a male fastener 1 and a corresponding female fastener 2. The male fastener 1 comprises a fastening bolt 3 with a serrated outer profile having a plurality of ridges 3a arranged one after the other along the fastening bolt 3 and running circumferentially around an outer surface of the fastening bolt 3. The female fastener 2 comprises an affixed base plate 6 connected to a component-side bracket 22 and a cover plate 7 fixed to the base plate 6 via spacers 21. The female fastener 2 further comprises a socket base 4 slidably arranged on the base plate 6 movable along a horizontal tolerance compensation plane H and having a conical funnel 12 configured to receive the fastening bolt 3 such that horizontal tolerances between the male fastener 1 and the female fastener 2 are compensable by movement of the socket base 4 within the female fastener 2. The horizontal tolerance compensation functions in a similar vein as for the embodiment of FIGS. 2 to 16 (cf. FIGS. 6 and 7 in particular).

The female fastener 2 further comprises a socket jaw 5 arranged on the socket base 4 and comprising three identical jaw segments 11 arranged circumferentially around a vertical tolerance compensation axis V such as to form a central jaw opening 14 configured to receive the fastening bolt 3 through the conical funnel 12 of the socket base 4. Also in this case each jaw segment 11 has a serrated inner profile with a plurality of ridges 11c arranged one after the other along the vertical tolerance compensation axis V, wherein the ridges 3a, 11c both of the fastening bolt 3 and the jaw segments 11 are formed as in the embodiment of FIGS. 2 to 15. In particular, each ridge 3a of the serrated outer profile of the fastening bolt 3 has an inclined top face 3b with an inclination angle of 60° and a horizontal bottom face 3c.

However, contrary to the socket jaw 5 of the embodiment of FIGS. 2 to 16, the present socket jaw 5 is not provided with a jaw bowl 8 and corresponding concave/convex bearing surfaces 8a, 11a. Instead, the socket jaw 5 further comprises a retainer ring 9 around the vertical tolerance compensation axis V. The retainer ring 9 is configured with a sliding track 9a of variable radius for each jaw segment 11, in which the respective jag segment 11 is slidably mounted to facilitate radial movement of the jaw segment 11 with respect to the vertical tolerance compensation axis V by rotation of the retainer ring 9 around the vertical tolerance compensation axis V (cf. FIGS. 20 and 21 in particular). As in the embodiment of FIGS. 2 to 15, such radial movement of the jaw segments 11 is used to adjust a size of the jaw opening 14 to retain the fastening bolt 3 along the vertical tolerance compensation axis V via contact of the serrated inner profile and the serrated outer profile and thereby compensate vertical tolerances between the male fastener 1 and the female fastener 2.

Figure 20:
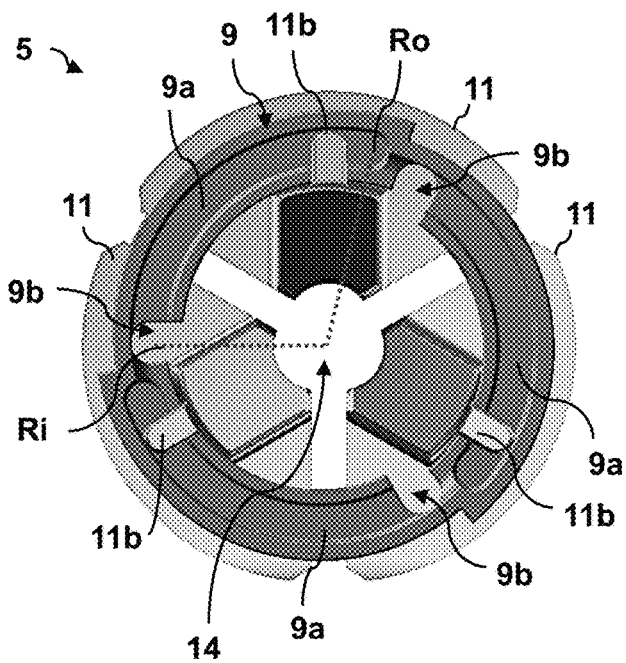
FIGS. 20 and 21 are detailed bottom views of components of the fastening arrangement of FIGS. 16-19 during assembly.
Figure 21:
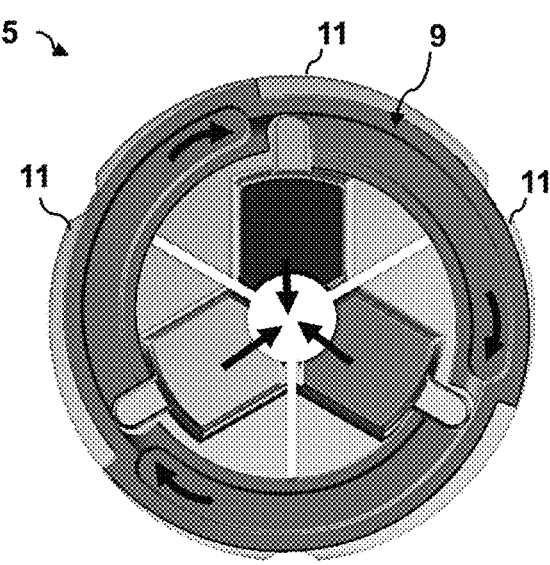

This mechanism is illustrated in FIGS. 20 and 21, which depict the retainer ring 9 and the jaw segments 11 from the bottom. As can be seen, the jaw segments 11 are placed on top of the retainer ring 9 and engage each associated sliding track 9a by means of a lock bolt 11b from below. FIG. 20 shows the socket jaw 5 in an open position, in which the jaw segments 11 are located at an outer radial position within each respective sliding track 9a such that the jaw opening 14 has a diameter large enough to receive the fastening bolt 3 therethrough. By turning the retainer ring 9 clockwise in FIG. 21, the jaw segments 11 are moved radially inwards to an inner radial position. Here, an outer radius Ro of the outer radial position is larger than the inner radius Ri of the inner radial position. For example, there may be a difference of one or several millimeters between inner radius Ri and outer radius Ro, e.g. 1.5 mm. In the present exemplary embodiment, a rotation of 90° is necessary to move the jaw segments 11 between both radial positions. However, the person of skill will readily acknowledge that various other configurations may be envisaged with a different number of jaw segments 11, radial displacements and rotation angles.

Due to this radial movement, the jaw opening 14 is narrowed down such that the fastening bolt 3 is engaged at its outer serrated profile by the inner serrated profile of the jaw segments 11. As a consequence, the fastening bolt 3 is fixed under a certain vertical displacement, which thus can be used to compensate tolerances between the male fastener 1 and the female fastener 2 along the vertical tolerance compensation axis V.

The retainer ring 9 may be moved manually for this purpose, e.g. by engaging the retainer ring 9 at an radially outside surface or a handle provided for this purpose (not shown in the figures). However, alternatively or additionally, an actuator may be provided for automated actuation of the socket jaw 5. It will be clear to the person of skill that the retainer ring 9 may further be configured with a spring element or return spring or the like, which may bias the position of the retainer ring 9 relative to the jaw segments 11, e.g. such that the jaw segments 11 are located in the radially inward position by default, which means that the retainer ring 9 has to be actively turned in order to open the jaw opening 14 for receiving the fastening bolt 3. The spring element may also be configured such that the fastening bolt 3 will push open the jaw opening 14, which will then close automatically around the fastening ring 3 at the final position due to a preload of the spring element.

The retainer ring 9 also provides a locking function to lock the fastening bolt 3 in a desired position along the vertical tolerance compensation axis V. To this end, a top face of the retainer ring 9 is cut-out to form a lock slot 9b in each sliding track 9a at a radially inward end position, as can be seen in FIGS. 20 and 21. The lock bolt 11b of each jaw segment 11 is configured complementary to the lock slot 9b to lock the jaw segments 11 at the radially inward end position within the retainer ring 9. For this purpose, the retainer ring 9 is configured to lock the jaw segments 11 by shifting downwards along the vertical tolerance compensation axis V and thereby move the lock slot 9b around the lock bolts 11b, thus block any further rotational movement of the retainer ring 9.

Figure 22:
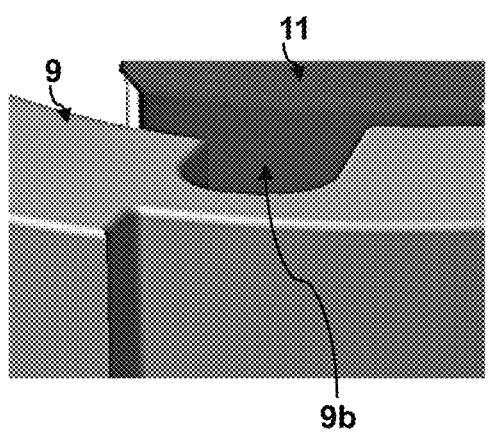
FIGS. 22 to 25 are detailed perspective views of the components shown in FIGS. 20 and 21.
Figure 23:
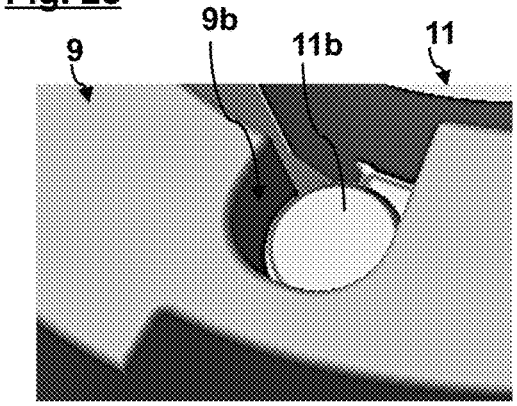
Figure 24:
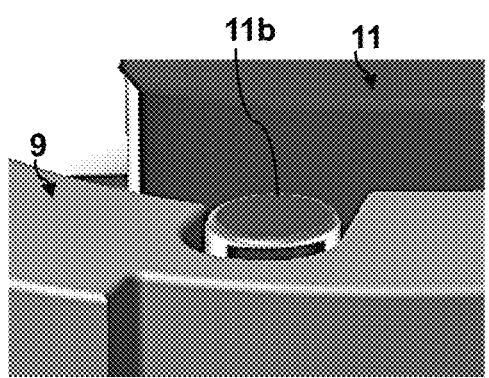
Figure 25:
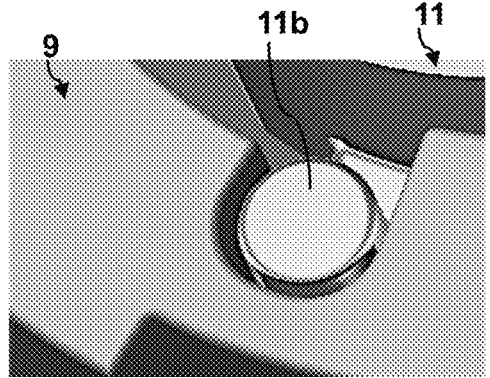

The above mechanism is shown in detail in FIGS. 22 to 25. FIGS. 22 and 23 depict the retainer ring 9 in an unlocked configuration, in which the lock bolt 11b has not entered the lock slot 9b. Assuming that the jaw segments 11 are at the radial inward end position and the fastening bolt 3 is firmly engaged at the outer serrated profile, the retainer ring 9 is now shifted by a predefined distance downwards along the vertical axis V, e.g. by 2 mm, so that the lock bolt 11b enters the lock slot 9b along the vertical tolerance compensation axis V and thereby blocks any further rotational movement of the retainer ring 9 around the vertical tolerance compensation axis V. Thus, retainer ring 9 and jaw segments 11 and thus the socket jaw 5 with the engaged fastening bolt 3 are locked in position. To unlock the system, the retainer ring 9 just has to be shifted back in vertical direction.

Again referring to FIGS. 16 and 17, the socket base 4 comprises a wedged turning surface 15 and the socket jaw 5 comprises a complementary wedged turning surface 16. Similar to the embodiment of FIGS. 2 to 15, also in this case the socket jaw 5 slidably rests with the complementary wedged turning surface 16 on the wedged turning surface 15 of the socket base 4 such that the socket jaw 5 is pressable against the cover plate 7 by relative rotation of the socket base 4 and the socket jaw 5 at the wedged turning surfaces 15, 16 around the vertical tolerance compensation axis V to block movement of the socket base 4 and the socket jaw 5 with respect to the base plate 6 and the cover plate 7. However, in the present embodiment, the wedged turning surfaces 15, 16 are oriented differently from the embodiment of FIGS. 2 to 15. Moreover, the complementary wedged turning surface 16 is provided on a bottom side of the jaw segments 11 (cf. FIG. 17), whereas in the embodiment of FIGS. 2 to 15 it is provided on a bottom side of protrusions 8c on the jaw bowl 8.

As can be seen in FIGS. 16 and 17 in particular, the wedged turning surface 15 of the socket base 4 is divided into three segments, each segment being oriented radially on top of the socket base 4 with respect to the vertical tolerance compensation axis V and having an inclined slope raising towards the center (cf. FIG. 16), e.g. with an angle of 15°. Accordingly, each jaw segment 11 has one complementary wedged turning surface 16 that is sloped accordingly in a radially outward direction (cf. FIG. 17). Due to this provision, a radially inward movement of the saw segments 11 automatically implies a vertical upward movement of the same, for example by a few millimeters, e.g. 0.4 mm. The effect of this is illustrated in FIGS. 26 to 28. In FIG. 26, the socket jaw 5 is in an open position, in which the jaw segments 11 are located at the radially outward position within their respective sliding tracks 9a. Thus, the jaw segments 11 are also located at a lower position along the vertical tolerance compensation axis V, which means that there is a gap between an upper side of the socket jaw 5 and the cover plate 7 (above in FIG. 26). By turning the retainer 9, as shown in FIG. 27, the jaw segments 11 are moved radially inwards and vertically upwards such that the gap is closed and the socket jaw 5 is pressed against the cover plate 7 with the jaw segments 11. Due to this force fit any movement of the socket base 4 along the horizontal tolerance compensation plane H is prevented. By shifting the retainer ring 9 downwards along the vertical tolerance compensation axis V, as seen in FIG. 28, the system is put into a locked position, which means that the system is fixed in horizontal as well as vertical direction.

It should be noted that the cover plate 7 of the present embodiment does not feature a serrated lower surface contrary to the embodiment of FIGS. 2 to 15, neither is the socket jaw 5 provided with a complementary serrated upper surface 18. It will be clear to the person of skill however that in alternative embodiments such additional means may be provided to further block horizontal movement of the socket base 4 in a locked/closed state by means of a form fit.

Summarizing, the present invention provides a simple yet effective solution for fastening a component to a structure taking tolerances into account. The solution is self-adjusting vertical and horizontal tolerances (due to the conical funnel 12) and may be configured self-closing/locking at least with respect to vertical tolerance compensation (cf. the embodiment of FIGS. 2 to 15). Horizontal movement may be blocked via a simple turning mechanism, which may be driven by an automatic actuator. Thus, the system can be fully automatized and thus significantly reduce manufacturing time and costs, in particular in aircraft construction. Generally, tolerances in all three dimensions can be compensated up to a predefined amount, e.g. ±10 mm. In addition, angular tolerances may be compensated by several degrees. Existing reference positions of the connected parts are maintained after the connection is closed. A particular advantage of the fastening arrangement 10 as disclosed is the possibility to manufacture some or all parts of male and female fasteners 1, 2 using a 3D printing or Additive Manufacturing (AM) technique.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the invention and its practical applications, to thereby enable others skilled in the art to best utilize the invention and various embodiments with various modifications as are suited to the particular use contemplated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 male fastener
2 female fastener
3 fastening bolt
3a fastening bolt ridge
3b top face
3c bottom face
4 socket base
5 socket jaw
6 base plate
7 cover plate
8 jaw bowl
8a concave bearing surface
8b bowl handle
8c bowl protrusion
9 retainer ring
9a sliding track
9b lock slot
10 fastening arrangement
11 jaw segment
11a convex bearing surface
11b lock bolt
11c jaw segment ridge
12 conical funnel
13 inner funnel surface
14 jaw opening
15 wedged turning surface
16 complementary wedged turning surface
17 serrated lower surface
18 serrated upper surface
19 spring element
20 segment connector
21 spacer
22 structure-side bracket
23 component-side bracket
100 aircraft
101 component
102 structure
Ri inner radius
Ro outer radius
H horizontal tolerance compensation plane
V vertical tolerance compensation axis

The invention claimed is:

1. A tolerance-compensating fastening arrangement for fastening a component to a structure, the fastening arrangement comprising:
 a male fastener comprising a fastening bolt having a serrated outer profile with a plurality of ridges arranged one after the other along the fastening bolt, each ridge running circumferentially around an outer surface of the fastening bolt; and
 a female fastener comprising:
  a socket base arranged within the female fastener movable along a horizontal tolerance compensation plane and having a conical funnel configured to receive the fastening bolt such that horizontal tolerances between the male fastener and the female fastener are compensable by movement of the socket base within the female fastener, the movement actuated through contact of the fastening bolt with an inner funnel surface of the conical funnel; and a socket jaw arranged on the socket base and comprising a plurality of jaw segments arranged circumferentially around a vertical tolerance compensation axis such as to form a central jaw opening configured to receive the fastening bolt through the conical funnel of the socket base, each jaw segment having a serrated inner profile with a plurality of ridges arranged one after the other along the vertical tolerance compensation axis, the jaw segments configured movable radially with respect to the vertical tolerance compensation axis to adjust a size of the jaw opening to retain the fastening bolt along the vertical tolerance compensation axis via contact of the serrated inner profile and the serrated outer profile and thereby compensate vertical tolerances between the male fastener and the female fastener.

2. The fastening arrangement according to claim 1, wherein the plurality of jaw segments comprise at least three identical jaw segments.

3. The fastening arrangement according to claim 1, wherein each ridge of the serrated outer profile of the fastening bolt has an inclined top face and a horizontal bottom face, the serrated inner profile of the jaw segments complementary serrated to the serrated outer profile of the fastening bolt.

4. The fastening arrangement according to claim 3, wherein the inclined top face has an inclination angle of 60°.

5. The fastening arrangement according to claim 1, wherein the female fastener further comprises a base plate, on which the socket base is slidably arranged, and a cover plate above the socket jaw, wherein the socket base comprises a wedged turning surface and the socket jaw comprises a complementary wedged turning surface, wherein the socket jaw slidably rests with the complementary wedged turning surface on the wedged turning surface of the socket base such that the socket jaw is pressable against the cover plate by relative rotation of the socket base and the socket jaw at the wedged turning surfaces around the vertical tolerance compensation axis to block movement of the socket base and the socket jaw with respect to the base plate and the cover plate.

6. The fastening arrangement according to claim 5, wherein the cover plate has a serrated lower surface and the socket jaw has a serrated upper surface complementary formed to the serrated lower surface of the cover plate.

7. The fastening arrangement according to claim 1, wherein the socket jaw further comprises a jaw bowl, the jaw bowl having a concave bearing surface and the jaw segments having a convex bearing surface configured to slidably mount the jaw segments within the jaw bowl such that angular tolerances between the male fastener and the female fastener are compensable by sliding movement of the fastening bolt together with the jaw segments within the jaw bowl.

8. The fastening arrangement according to claim 7, wherein the concave bearing surface of the jaw bowl and the convex bearing surface of the jaw segments are configured basically spheroid.

9. The fastening arrangement according to claim 7, wherein the concave bearing surface of the jaw bowl and the convex bearing surface of the jaw segments are configured basically conical.

10. The fastening arrangement according to claim 7, wherein the female fastener comprises a cover plate above the socket jaw and the socket jaw comprises a spring element configured to resiliently preload the jaw segments against the cover plate.

11. The fastening arrangement according to claim 1, wherein the socket jaw further comprises a retainer ring around the vertical tolerance compensation axis, the retainer ring configured with a sliding track of variable radius for each jaw segment, in which the respective jag segment is slidably mounted to facilitate radial movement of the jaw segment with respect to the vertical tolerance compensation axis by rotation of the retainer ring around the vertical tolerance compensation axis.

12. The fastening arrangement according to claim 11, wherein each sliding track is configured with a lock slot at a radially inward end position and wherein each jaw segment is configured with a lock bolt complementary formed to the lock slot to lock the jaw segments at the radially inward end position within the retainer ring.

13. The fastening arrangement according to claim 11, wherein the retainer ring is configured to lock the jaw segments by shifting along the vertical tolerance compensation axis.

14. The fastening arrangement according to claim 1, wherein the component comprises a plurality of male fasteners and the structure comprises corresponding female fasteners.

15. An aircraft or spacecraft having a fastening arrangement according to claim 1.

* * * * *